(12) United States Patent
Muramatsu et al.

(10) Patent No.: US 10,626,962 B2
(45) Date of Patent: Apr. 21, 2020

(54) DRIVE DEVICE FOR OPENING/CLOSING BODY FOR VEHICLE

(71) Applicant: SHIROKI CORPORATION, Fujisawa-shi, Kanagawa (JP)

(72) Inventors: Atsushi Muramatsu, Fujisawa (JP); Kenji Yamamoto, Fujisawa (JP); Kenichi Suzuki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 231 days.

(21) Appl. No.: 15/746,585

(22) PCT Filed: Sep. 2, 2016

(86) PCT No.: PCT/JP2016/075865
§ 371 (c)(1),
(2) Date: Jan. 22, 2018

(87) PCT Pub. No.: WO2017/038990
PCT Pub. Date: Mar. 9, 2017

(65) Prior Publication Data
US 2018/0209519 A1    Jul. 26, 2018

(30) Foreign Application Priority Data
Sep. 4, 2015   (JP) ................. 2015-174801

(51) Int. Cl.
*F16H 19/06* (2006.01)
*E05F 11/48* (2006.01)
(Continued)

(52) U.S. Cl.
CPC ........ *F16H 19/0631* (2013.01); *E05F 11/483* (2013.01); *E05F 15/00* (2013.01);
(Continued)

(58) Field of Classification Search
CPC .............. F16H 19/0631; F16H 19/0645; E05F 15/697; E05F 11/488; F02B 75/045
See application file for complete search history.

(56) References Cited

U.S. PATENT DOCUMENTS 4,194,605 A  *  3/1980  Sessa ..................... E05F 11/505
                                                         192/12 R
4,428,250 A  *  1/1984  Becker .................. E05F 15/689
                                                         254/362
(Continued)

FOREIGN PATENT DOCUMENTS

JP          8021150 A       1/1996
JP          9-144424 A      6/1997
(Continued)

OTHER PUBLICATIONS

International Search Report (PCT/ISA/210) dated Oct. 18, 2016, by the Japanese Patent Office as the International Searching Authority for International Application No. PCT/JP2016/075865.
(Continued)

*Primary Examiner* — Terence Boes
(74) *Attorney, Agent, or Firm* — Buchanan Ingersoll & Rooney PC

(57) ABSTRACT

A drive device includes a drum housing rotatably supports a drum, allows an outer tube end to be inserted into an outer tube connecting portion and allows a wire to pass through a wire passage portion, and a drive member rotates the drum. An anti-deflection portion limits deflection of the wire and is formed on the drum housing/drive member. The anti-deflection portion includes a range surrounded by a line connecting one end of the formation range of the spiral groove and one end of the formation range of the insertion hole at the outer tube end connected to the outer tube connecting portion and a line connecting the other end of the spiral groove formation range and the other end of the
(Continued)

insertion hole formation range at the end of the outer tube connected to the outer tube connecting portion, in the rotational axis direction of the drum.

3 Claims, 8 Drawing Sheets

(51) Int. Cl.
    *E05F 15/697* (2015.01)
    *E05F 15/00* (2015.01)

(52) U.S. Cl.
    CPC ....... *E05F 15/697* (2015.01); *F16H 19/0645* (2013.01); *E05Y 2201/10* (2013.01); *E05Y 2201/654* (2013.01); *E05Y 2201/66* (2013.01); *E05Y 2201/664* (2013.01); *E05Y 2201/71* (2013.01); *E05Y 2900/531* (2013.01); *E05Y 2900/55* (2013.01)

(56) References Cited

U.S. PATENT DOCUMENTS

| | | | | |
|---|---|---|---|---|
| 5,172,463 | A * | 12/1992 | Roth | E05F 11/483 29/434 |
| 6,032,415 | A * | 3/2000 | Tajima | E05F 15/41 49/26 |
| 6,408,572 | B1 * | 6/2002 | Uchimura | E05F 11/485 464/92 |
| 2005/0016071 | A1 * | 1/2005 | Takeda | B60J 5/0416 49/352 |
| 2006/0130405 | A1 * | 6/2006 | Hemond | E05F 15/697 49/352 |
| 2019/0085613 | A1 * | 3/2019 | Muramatsu | B60J 1/17 |
| 2019/0284863 | A1 * | 9/2019 | Kalb | H02K 7/1166 |

FOREIGN PATENT DOCUMENTS

| | | |
|---|---|---|
| JP | 10-339068 A | 12/1998 |
| JP | 2004-162892 A | 6/2004 |
| JP | 2011-74657 A | 4/2011 |
| JP | 2014-201905 A | 10/2014 |

OTHER PUBLICATIONS

Written Opinion (PCT/ISA/237) dated Oct. 18, 2016, by the Japanese Patent Office as the International Searching Authority for International Application No. PCT/JP2016/075865.

\* cited by examiner

DRIVE DEVICE FOR OPENING/CLOSING BODY FOR VEHICLE

TECHNICAL FIELD

The present invention relates to a drive device for an opening/closing body which is mounted to a vehicle.

BACKGROUND ART

In drive devices for an opening/closing body for a motor vehicle such as window regulators for raising and lowering a window glass and door opening/closing systems for opening and closing a slide door, a structure which drives the opening/closing body (a window glass/a slide door) by moving (pulling/loosening) a wire by rotations of a winding drum around which the wire is wound has been frequently used. A spiral groove is formed on the outer periphery of the winding drum. An end of a tubular-shaped outer tube is connected to a drum housing which accommodates the winding drum, and the wire that extends from the spiral groove of the winding drum is inserted into an insertion hole in the outer tube through a passage in the drum housing in a manner to be capable of advancing into and retreating from the insertion hole.

In this type of drive device, rotation of the winding drum causes the wire to deflect (vibrate) in the rotational axis direction of the winding drum in accordance with the inclination of the spiral groove. In such case, if the deflection amount (deflection angle) of the wire is great, there is a possibility of the wire interfering with the edge of the insertion hole at an end face of the outer tube and being damaged by being repeatedly driven. As a countermeasure for this, a configuration is known in which a bush member into which the end of the outer tube is insertable is provided as a separate member from the drum housing, in which an anti-deflection hole which progressively increases the inner diameter thereof in a direction away from the end of the outer tube is formed in the bush member, and in which the outer tube is connected to the drum housing via the bush member (Patent Literature 1). When the winding drum rotates, the deflection angle of the wire is limited by the inner surface of the anti-deflection hole, which makes it possible to protect the wire.

CITATION LIST

Patent Literature

[Patent Literature 1]
Japanese Unexamined Patent Publication No. H09-144424

SUMMARY OF INVENTION

Technical Problem

In the anti-deflection structure for the wire disclosed in Patent Literature 1, the bush member needs to be installed in addition to the drum housing; therefore, compared with the configuration in which the outer tube is directly connected to the drum housing, there is a possibility of the production being troublesome due to an increase in assembly man-hours and also there is a possibility of the production cost increasing due to an increase in number of components.

The present invention has been made in view of the above described issues, and it is an object of the present invention to provide a drive device for an opening/closing body for a vehicle which makes it possible to achieve an improvement in durability of the wire even though productive and inexpensive.

Solution to Problem

In a drive device for an opening/closing body for a vehicle which opens and closes the opening/closing body by driving a wire and includes: an outer tube having an insertion hole into which the wire is inserted; a columnar drum on the peripheral surface of which a spiral groove is formed, the wire being wound in the spiral groove; a drum housing which rotatably supports the drum in a housing portion, allows an end of the outer tube to be inserted into an outer tube connecting portion and allows the wire to pass through a wire passage portion between the outer tube connecting portion and the housing portion; and a drive member which is installed to the drum housing and rotates the drum, the present invention has features below. An anti-deflection portion which limits deflection of the wire in the rotational axis direction of the drum is formed on the drum housing or the drive member. The anti-deflection portion is provided within a range surrounded by a line which connects one end of the formation range of the spiral groove and one end of the formation range of the insertion hole at the end of the outer tube that is connected to the outer tube connecting portion and a line which connects the other end of the formation range of the spiral groove and the other end of the formation range of the insertion hole at the end of the outer tube that is connected to the outer tube connecting portion, in the rotational axis direction of the drum.

It is desirable that the drum housing or the drive member be provided with a first anti-deflection portion which limits the deflection of the wire in a first direction along the rotational axis direction of the drum; and a second anti-deflection portion which limits the deflection of the wire in a second direction opposite to the first direction.

In this case, it is desirable that the wire passage portion be made as a wire passage groove having an opening which is open in the first direction, that the first anti-deflection portion be provided in the wire passage groove, and that a clearance which makes insertion and removal of the wire through the opening possible be formed between a side surface of the wire passage groove and the first anti-deflection portion. This clearance may be formed by widening the width of the opening at a portion where the first anti-deflection portion is provided.

Additionally, it is desirable that the drum housing be made to make the wire passage portion serve as a wire passage groove having an opening which is open in the first direction and to make the housing portion open in the first direction, that the positions of the first anti-deflection portion and the second anti-deflection portion be mutually different in the longitudinal direction of the wire passage groove, and that a through-hole be formed in a bottom portion of the wire passage groove in the second direction which faces the opening at least at a position corresponding to the first anti-deflection portion. The drum housing configured as described above can be easily produced using molds that are relatively movable in the first direction and the second direction (in the rotational axis direction of the drum).

Advantageous Effects of the Invention

According to the drive device for an opening/closing body for a vehicle according to prevent invention described above, deflection of the wire in the rotational axis direction of the drum is limited by the anti-deflection portion, which is provided on either the drum housing, which accommodates the drum, or the drive member, which drives the drum; consequently, the durability of the wire can be securely improved by an inexpensive and productive configuration with a small number of components.

DESCRIPTION OF EMBODIMENT

Figure 1:
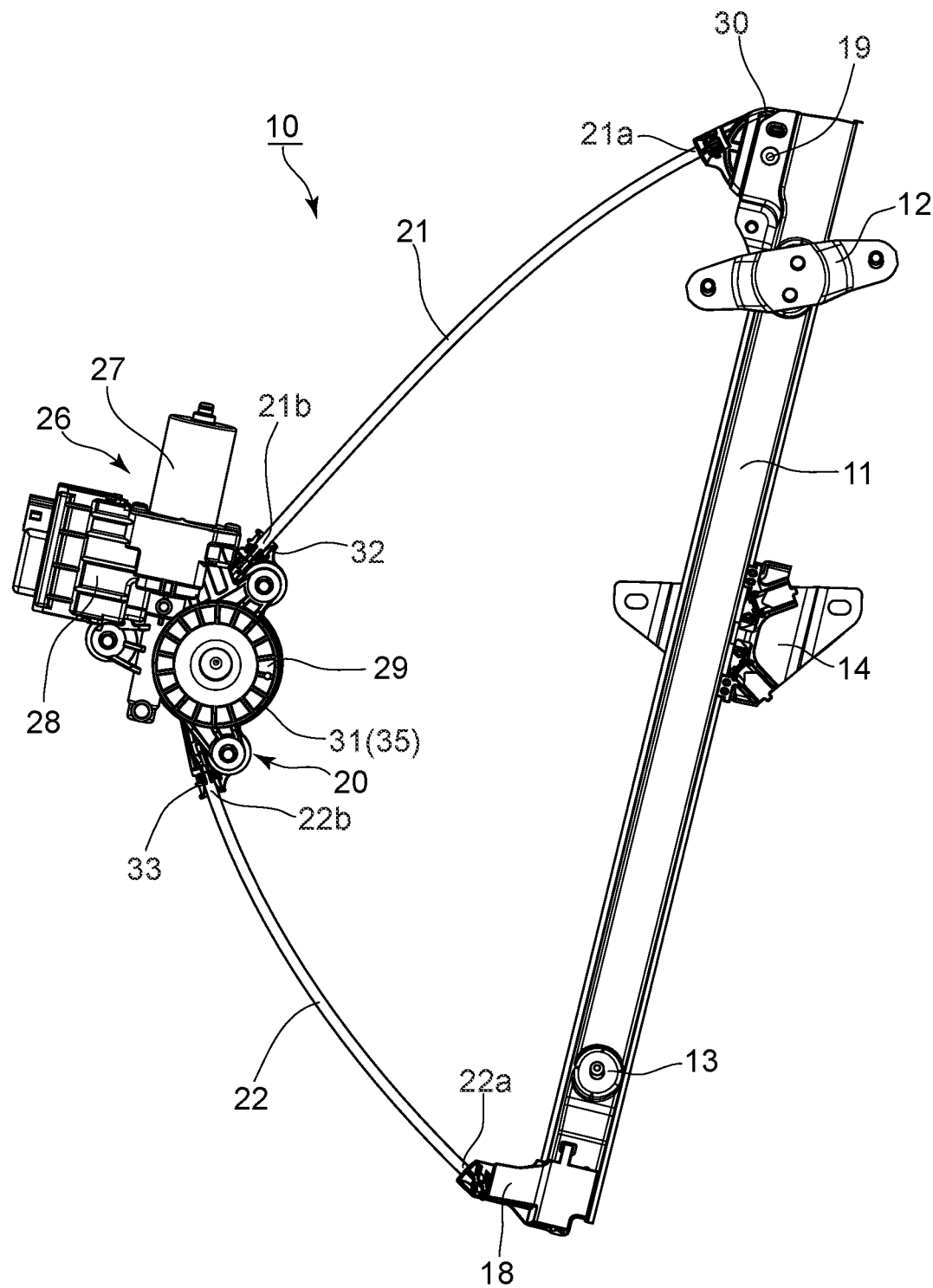
FIG. 1 is a front elevational view of a window regulator according to the present invention.
Figure 2:
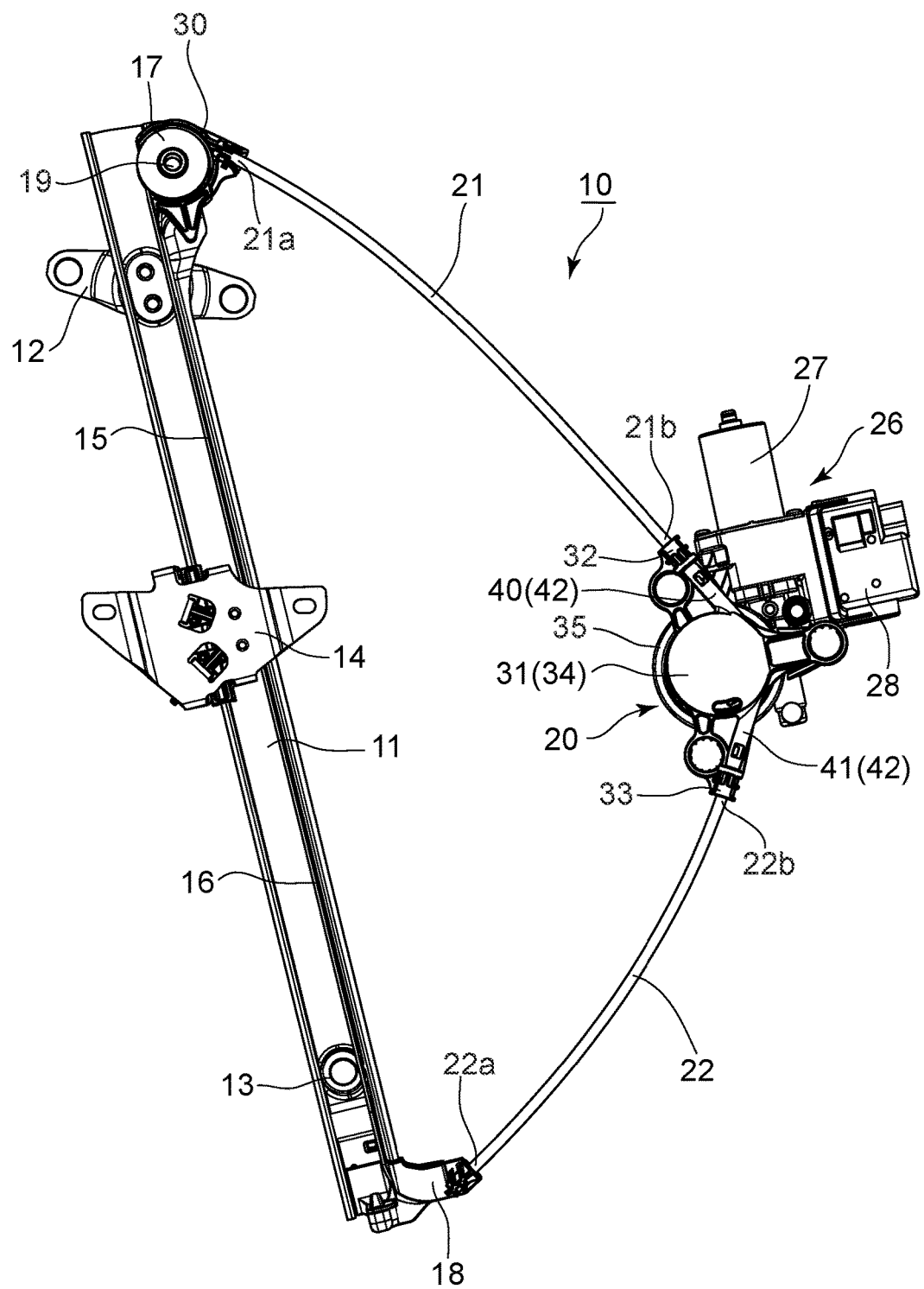
FIG. 2 is a rear elevational view of the window regulator.
Figure 3:
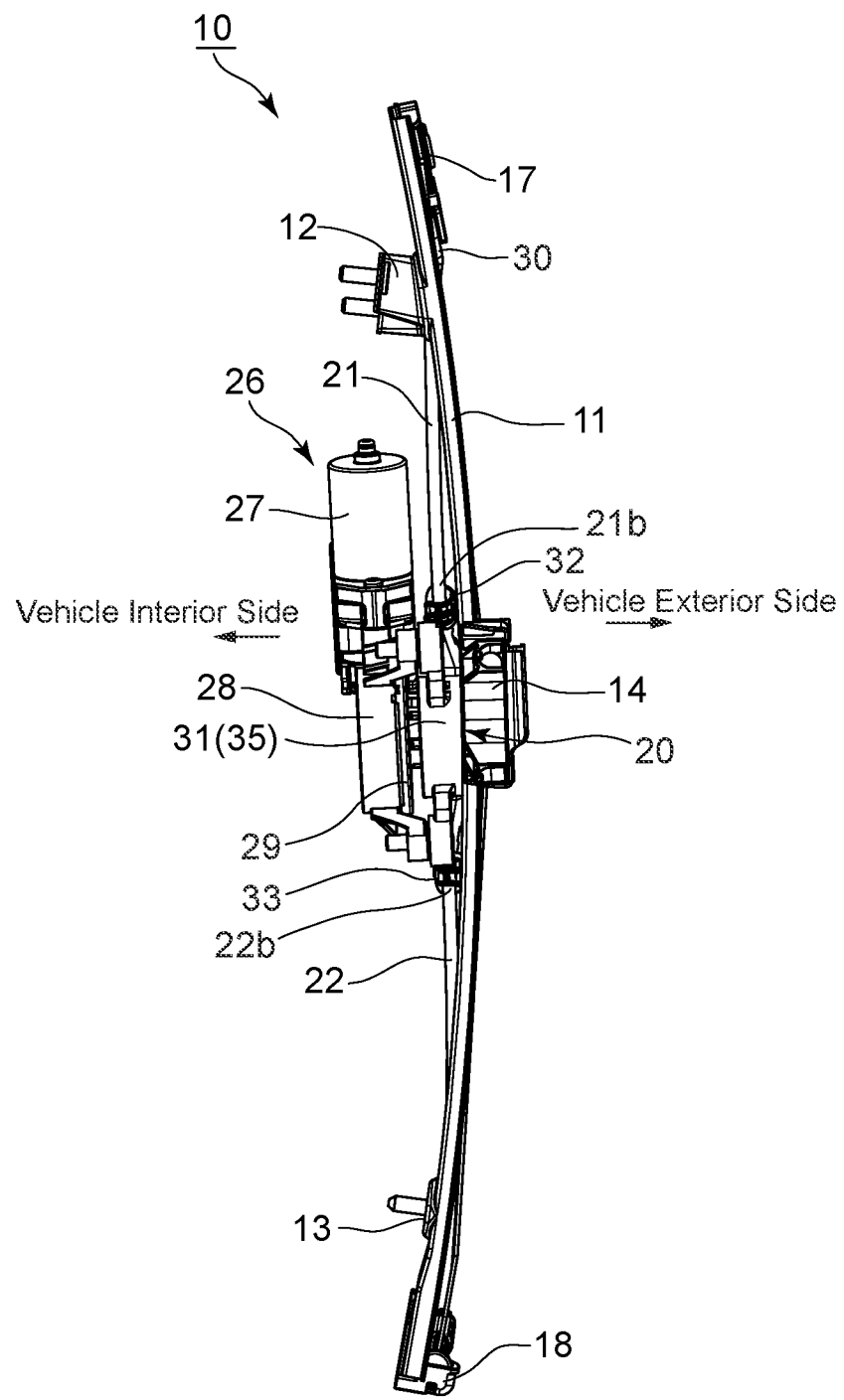
FIG. 3 is a side elevational view of the window regulator.

As a drive device for an opening/closing body for a vehicle according to the present invention, an embodiment applied to a window regulator which drives a window glass (opening/closing body) for opening and closing a window opening of a door will be discussed hereinafter. A window regulator 10 shown in FIGS. 1 through 3 is installed in a door panel (not shown) of a vehicle and operates to raise and lower a window glass (not shown). In FIG. 3, the directions toward the vehicle exterior side and the vehicle interior side with the window regulator 10 installed to the vehicle door panel are shown by arrows. The window regulator 10 is provided with a guide rail 11 that is made as a long member. The guide rail 11 is fixed to a door panel (inner panel) via brackets 12 and 13 provided at different positions in the longitudinal direction of the guide rail 11. In this fixed state, the guide rail 11 is positioned so that the longitudinal direction thereof extends substantially in the vehicle height direction.

A slider base 14 (glass carrier) which supports a window glass is supported to be movable in the longitudinal direction of the guide rail 11. One ends of a pair of wires 15 and 16 (FIG. 2) are connected to the slider base 14. A pulley bracket 30 is fixed to the guide rail 11 in the vicinity of one end thereof in the longitudinal direction of the guide rail 11, and a guide pulley 17 is supported on the pulley bracket 30 to be rotatable via a pulley support shaft 19. The wire 15 extends along the guide rail 11 from the slider base 14 in a direction toward one end of the guide rail 11 and is guided by a wire guide groove formed on the outer periphery of the guide pulley 17. The guide pulley 17 rotates on the pulley support shaft 19 in accordance with advancing and retreating movements of the wire 15. A wire guide member 18 is provided in the vicinity of the other end of the guide rail 11 in the longitudinal direction thereof, and the wire 16 extends along the guide rail 11 from the slider base 14 toward the other end of the guide rail 11 and is guided by the wire guide member 18. The wire guide member 18 is fixed to the guide rail 11, and the wire 16 is supported to be capable of advancing and retreating along a wire guide groove formed on the wire guide member 18.

Figure 7:
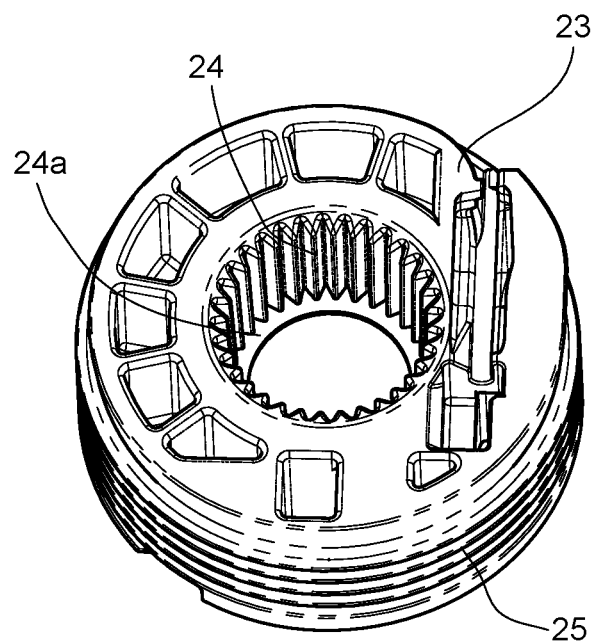
FIG. 7 is a perspective view of the winding drum.
Figure 8:
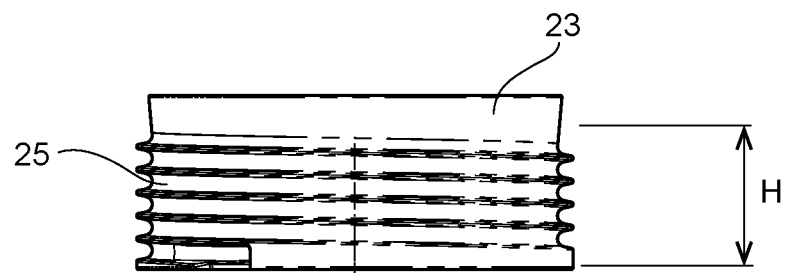
FIG. 8 is a side elevational view of the winding drum, viewed in a direction orthogonal to the rotational axis of the winding drum.

The wires 15 and 16 that extend from the guide pulley 17 and the wire guide member 18 are inserted into tubular-shaped guide tubes 21 and 22, respectively, and wound around a winding drum 23 that is provided inside a drum housing 20 to which the guide tubes 21 and 22 are connected. As shown in FIGS. 7 and 8, the winding drum 23 is columnar in shape, and a shaft fitting hole 24 is formed through a central portion of the winding drum 23 in the axial direction. A serration is formed on the inner surface of the shaft fitting hole 24. A spiral groove 25 in which the wires 15 and 16 are wound is formed on the outer periphery of the winding drum 23. The spiral groove 25 varies the position thereof in the axial direction of the winding drum 23 while turning along the outer periphery of the winding drum 23. Formation range H of the spiral groove 25 in the axial direction of the winding drum 23 is shown in FIG. 8.

A motor unit (drive member) 26 (FIGS. 1 through 3) is mounted to the drum housing 20. The motor unit 26 is provided with a motor 27, a gear box 28 and a fitting shaft (not shown). The gear box 28 incorporates a reduction gear train which transmits rotation of the output shaft of the motor 27 while reducing the speed of this rotation, and the rotational driving force of the motor 27 is transmitted to the fitting shaft via the reduction gear train of the gear box 28. The motor unit 26 is provided with a cover portion 29 which covers an opening of the drum housing 20 which will be discussed later, and the fitting shaft projects from the cover portion 29 to fit into the shaft fitting hole 24. A serration which is engaged with the serration of the shaft fitting hole 24 is formed on the fitting shaft. In this engaged state of the shaft fitting hole 24 and the fitting shaft, driving the motor 27 causes the winding drum 23 to rotate with the fitting shaft.

The outer tube 21 is connected at one end and the other end thereof to the pulley bracket 30 and the drum housing 20, respectively, and the wire 15 can advance and retreat in the outer tube 21 with the positions of both ends thereof being fixed. The outer tube 22 is connected at one end and the other end thereof to the wire guide member 18 and the drum housing 20, respectively, and the wire 16 can advance and retreat in the outer tube 22 with the positions of both ends thereof being fixed. Each outer tube 21 and 22 is provided therein with an insertion hole 50 (FIG. 9) which penetrates therethrough in the longitudinal direction of the outer tube, and each wire 15 and 16 is inserted into the associated insertion hole 50. The end of the outer tube 21 which is connected to the pulley bracket 30 is referred to as a rail-side end 21a, while the end of the outer tube 22 which is connected to the wire guide member 18 is referred to as a rail-side end 22a. In addition, the ends of the outer tubes 21 and 22 which are connected to the drum housing 20 are referred to as drum-side ends 21b and 22b, respectively.

The drum housing 20 is fixed to a door panel (inner panel). Forward and reverse rotations of the winding drum 23 by the driving force of the motor 27 cause one of the wires 15 and 16 to increase the winding amount thereof along the winding groove 25 of the winding drum 23 and cause the other of the wires 15 and 16 to be unreeled from the spiral groove 25 of the winding drum 23, thereby causing the slider base 14 to move along the guide rail 11 due to the pulling-loosening relationship between the pair of wires 15 and 16. In accordance with the movement of the slider base 14, the window glass moves up and down.

Figure 4:
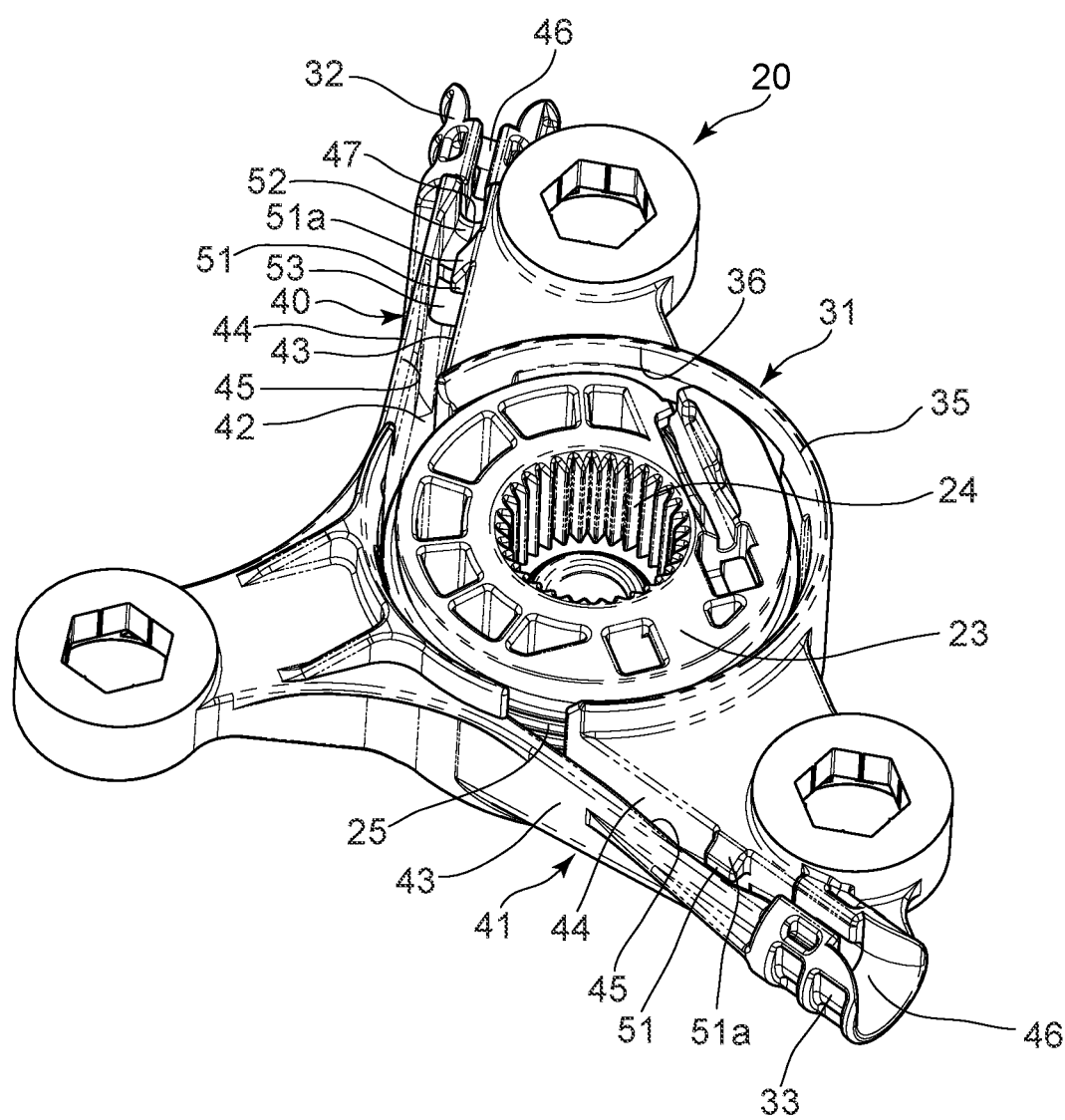
FIG. 4 is a perspective view of a drum housing with a winding drum accommodated therein.
Figure 5:
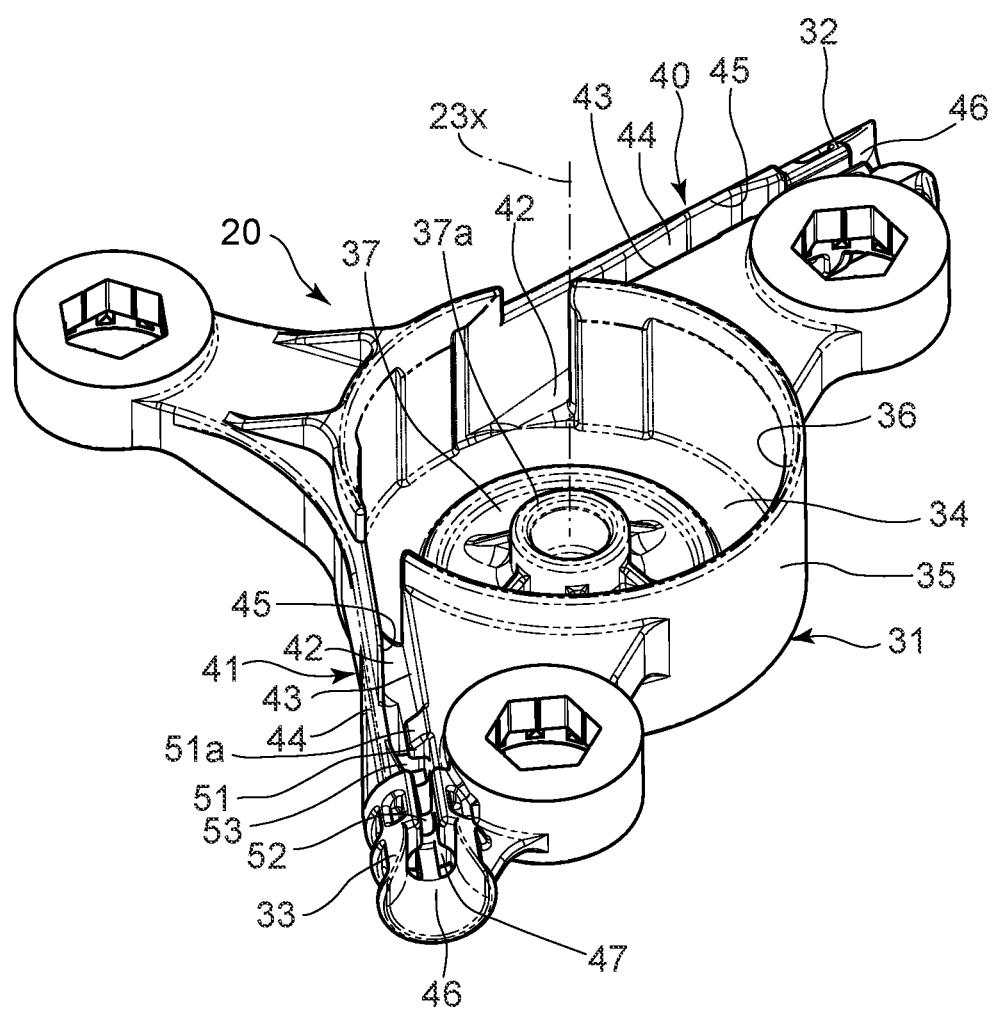
FIG. 5 is a perspective view of the drum housing without the winding drum accommodated therein, viewed from a different angle from FIG. 4.
Figure 6:
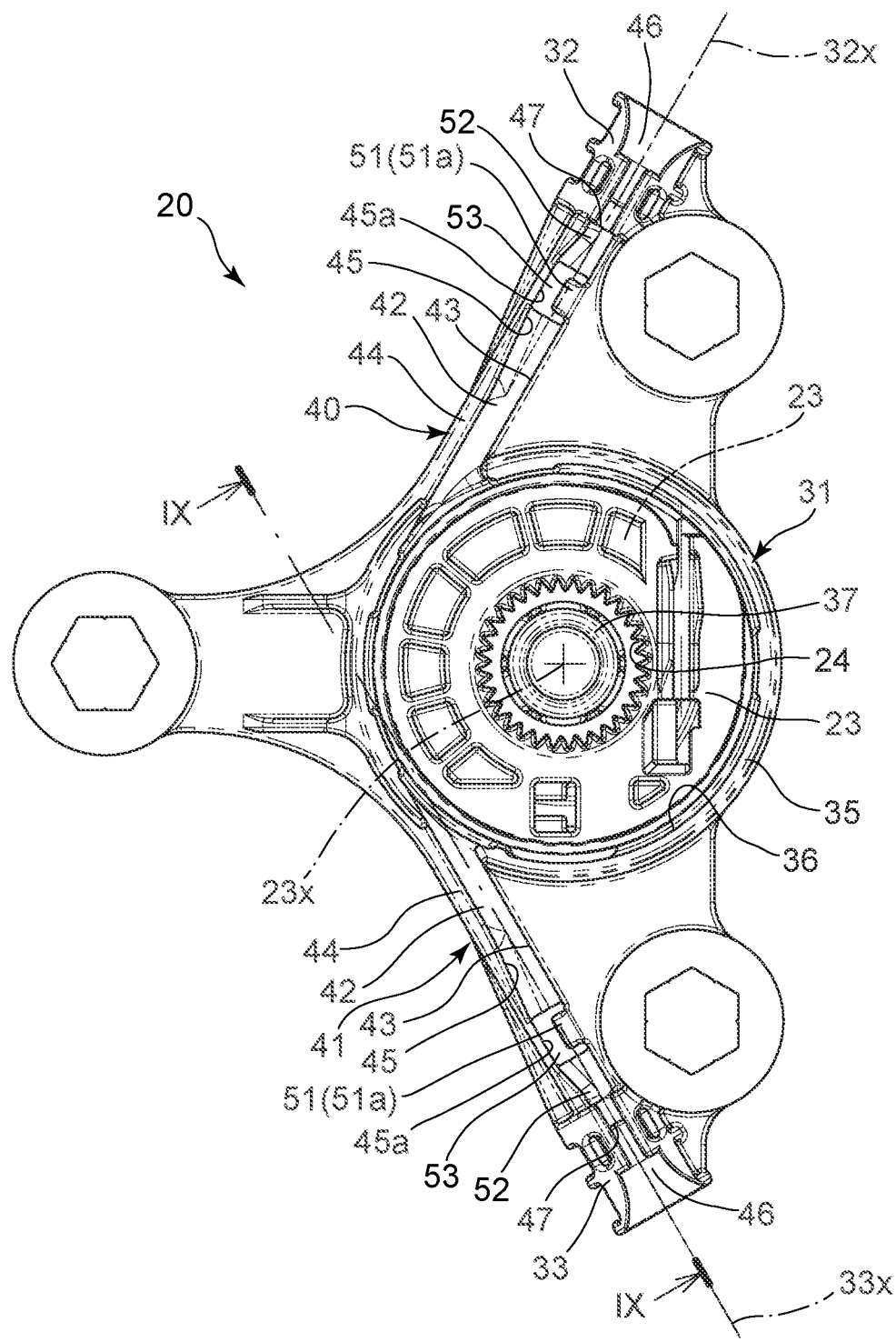
FIG. 6 is a plan view of the drum housing with the winding drum accommodated therein.

The drum housing 20, to which the outer tubes 21 and 22 are connected, will be discussed hereinafter. As shown in FIGS. 4 through 6, the drum housing 20 is provided with a drum housing portion (housing portion) 31 and a pair of outer tube insertion portions (outer tube connecting portions) 32 and 33. The drum housing portion 31 forms space which is surrounded by a bottom portion 34 and a cylindrical upright wall 35 formed on the outer edge of the bottom portion 34, and the drum housing portion 31 has a housing portion opening 36 on the opposite side of the bottom portion 34. The bottom portion 34 is provided with a drum support seat 37 (FIG. 5). The winding drum 23 is inserted into the drum housing portion 31 with one end of the winding drum 23 mounted on the drum support seat 37. The drum support seat 37 is provided with a cylindrical shaft projection 37a (FIG. 5), and a smooth cylindrical surface 24a (FIG. 7) is formed on part of the shaft fitting hole 24. The shaft projection 37a is inserted into the cylindrical surface 24a, and the winding drum 23 is rotatably supported with the cylindrical surface 24a made into sliding contact with the shaft projection 37a. A rotational axis 23x as the center of rotation of the winding drum 23 in an accommodated state of the winding drum 23 in the drum housing portion 31 is shown by one-dot chain line in FIGS. 5 and 6. Upon the transmission of the driving force of the motor 27, the winding drum 23 rotates about the rotational axis 23x.

A wire passage groove (wire passage portion) 40 and a wire passage groove (wire passage portion) 41 which are communicatively connected to the drum housing portion 31 are formed in the drum housing 20 to extend in different directions (directions toward the pulley bracket 30 and the wire guide member 18 in a completed state of the window regulator 10). The outer tube insertion portion 32 is provided at the front end of the wire passage groove 40 and the outer tube insertion portion 33 is provided at the front end of the wire passage groove 41.

The wire passage groove 40 and the wire passage groove are substantially identical in structure, and common elements between the wire passage groove 40 and the wire passage groove 41 are designated by the same symbols in the drawings. Each of the wire passage grooves 40 and 41 is a groove-like portion which juts from the drum housing portion 31 in a direction intersecting (substantially orthogonal to) the rotational axis 23x. Each of the wire passage grooves 40 and 41 is provided with a bottom portion 42 which is continuous with the bottom portion 34 of the drum housing portion 31 and a pair of side walls 43 and 44 which stand from the bottom portion 42 in a direction along the rotational axis 23x (the projecting direction of the upright wall 35). A passage groove opening 45 is formed in a top-side portion which faces the bottom portion 42. The passage groove opening 45 is an opening which is communicatively connected with the housing portion opening 36 of the drum housing portion 31.

The drum-side end 21b of the outer tube 21 is insertable into the outer tube insertion portion 32, and the drum-side end 22b of the outer tube 22 is insertable into the outer tube insertion portion 33. An insertion axis 32x which defines the insertion direction of the drum-side end 21b into the outer tube insertion portion 32 and an insertion axis 33x which defines the insertion direction of the drum-side end 22b into the outer tube insertion portion 33 are shown in FIG. 6.

The outer tube insertion portion 32 and the outer tube insertion portion 33 are substantially identical in structure, and common elements between the outer tube insertion portion 32 and the outer tube insertion portion 33 are designated by the same symbols in the drawings. Insertion grooves 46 are formed inside the outer tube insertion portion 32 and the outer tube insertion portion 33 to extend therethrough in the direction of the insertion axes 32x and 33x, respectively. The insertion grooves 46 are communicatively connected with the wire passage grooves 40 and 41. A stepped insertion restriction surface 47 is formed in the vicinity of the boundary between the wire passage groove 40 and the insertion groove 46 and a stepped insertion restriction surface 47 is formed in the vicinity of the boundary between the wire passage groove 41 and the insertion groove 46. The insertion position of the outer tube 21 into the outer tube insertion portion 32 is determined by contact of the end face of the drum-side end portion 21b of the outer tube 21 with the associated insertion restriction surface 47, and the insertion position of the outer tube 22 into the outer tube insertion portion 33 is determined by contact of the end face of the drum-side end portion 22b of the outer tube 22 with the associated insertion restriction surface 47 (see FIG. 9). The passage groove openings 45 of the wire passage grooves 40 and 41 are formed continuously to the outer tube insertion portions 32 and 33, respectively. The widths of the passage groove openings 45 in the outer tube insertion portions 32 and 33 are smaller than the diameters of the outer tubes 21 and 22, which prevent the drum-side end portions 21b and 22b of the outer tubes 21 and 22 that are inserted into the outer tube insertion portions 32 and 33 from coming off through the passage groove openings 45, respectively.

When the window regulator 10 is assembled, the wires 15 and 16 which project from the end faces of the drum-side end portions 21b and 22b of the outer tubes 21 and 22 are inserted into the insertion grooves 46 of the outer tube insertion portions 32 and 33 and the wire passage grooves 40 and 41 through the wire passage openings 45, respectively, while the drum-side end portions 21b and 22b are inserted into the insertion grooves 46 of the outer tube insertion portions 32 and 33 along the insertion axes 32x and 33x, respectively. The positions of the outer tubes 21 and 22 in the directions of the insertion axes 32x and 33x are determined by contact of the end faces of the drum-side end portions 21b and 22b with the insertion restriction surfaces 47, respectively. The wires 15 and 16 are led into the drum housing portion 31 through the wire passage grooves 40 and 41 to be wound in the spiral groove 25 on the outer periphery of the winding drum 23. In the state (FIGS. 1 through 3 and 9) where the wires 15 and 16 have been installed in such a manner, the wires 15 and 16 can advance and retreat in the insertion holes 50 (FIG. 9) with respect to the outer tubes 21 and 22, respectively, so that the winding amount of each wire 15 and 16 on the spiral groove 25 varies in accordance with rotation of the winding drum 23.

In addition, the motor unit 26 is mounted to the top side of the drum housing 20. The cover portion 29 of the motor unit 26 closes the housing portion opening 36 and the passage groove opening 45 of the drum housing 20 to prevent the winding drum 23 from coming off the drum housing portion 31. This mounting of the motor unit 26 causes the fitting shaft (not shown) of the motor unit 26 to fit into the shaft fitting hole 24 as described above, which makes the transmission of the driving force of the motor 27 to the winding drum 23 possible.

In the window regulator 10 in which the wires 15 and 16 have been routed as described above, the feed-out position of each wire 15 and 16 from the spiral groove 25 varies in the direction along the rotational axis 23x when the winding drum 23 rotates. The drum housing 20 is provided in each wire passage groove 40 and 41 with a first anti-deflection portion (anti-deflection portion/first anti-deflection portion)

51 and a second anti-deflection portion (anti-deflection portion/second deflection portion) 52 as an anti-deflector which limits deflection of the associated wire 15 or 16.

Figure 9:
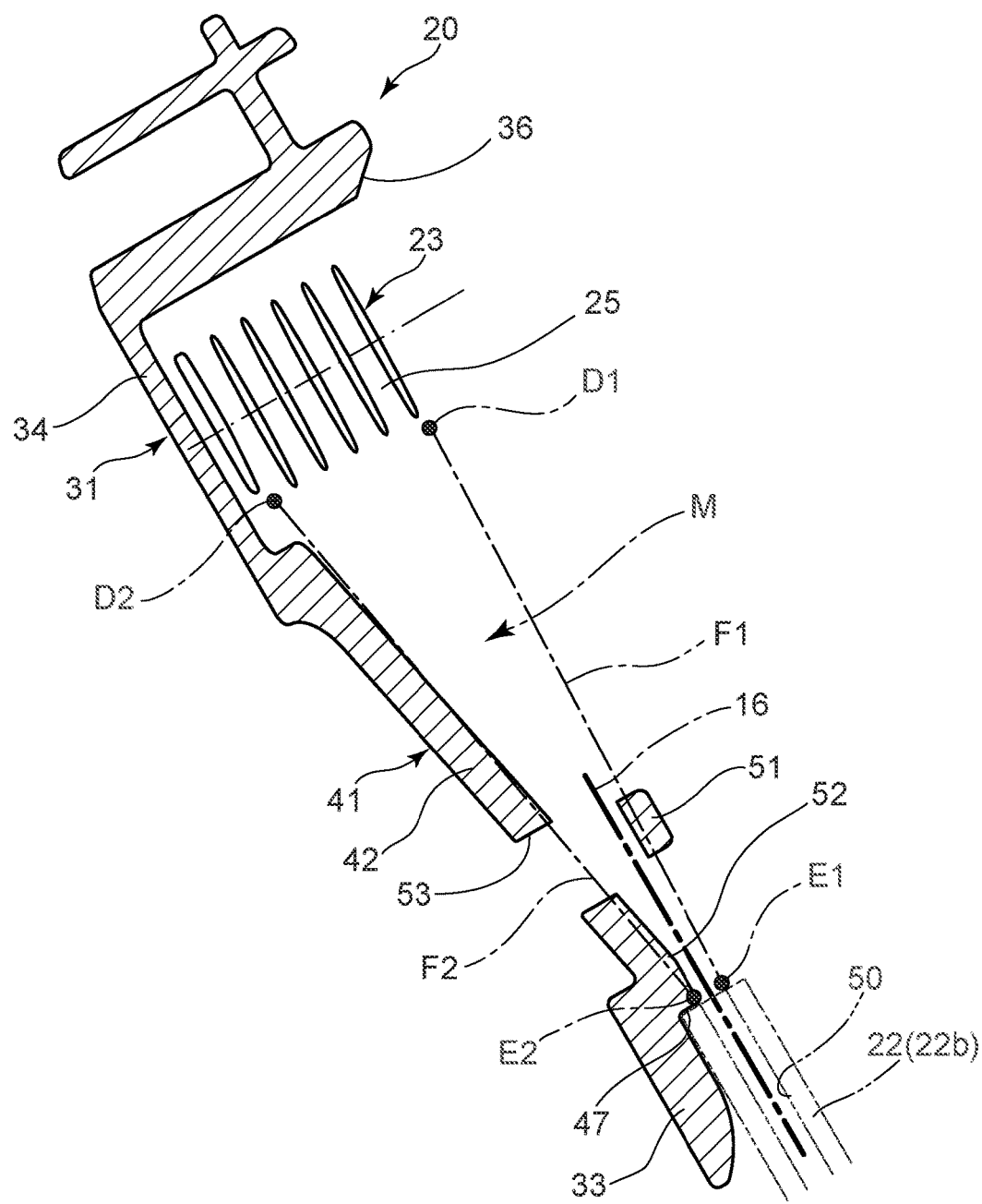
FIG. 9 is a cross sectional view of the drum housing, taken along the line IX-IX shown in FIG. 6.

One end D1 and the other end D2 of the formation range H (FIG. 8) of the spiral groove 25 of the winding drum 23 in the direction of the rotational axis 23x and one end E1 and the other end E2 of the formation range of the insertion hole 50 of the drum-side end portion 22b of the outer tube 22 are shown in FIG. 9. F1 designates an imaginary line which connects the one end D1 on the spiral groove 25 side and the one end E1 on the insertion hole 50 side, and F2 designates an imaginary line which connects the other end D2 on the spiral groove 25 side and the other end E2 on the insertion hole 50 side. As shown in FIG. 9, the wire 16 is supported by the winding drum 23 (the spiral groove 25) and the drum-side end portion 22b (the insertion hole 50) of the outer tube 22 in the drum housing 20 and not supported by the winding drum 23 or the outer tube 22 in the wire passage groove 41 that is positioned therebetween. Accordingly, in the case where the anti-deflector is not provided, there is a possibility of the wire 16 deflecting in a range surrounded by the imaginary line F1 and the imaginary line F2 (this range is referred to as deflectable range M). Although FIG. 9 shows the relationship between the wire 16 and the wire passage groove 41, the wire 15 and the wire passage groove 40 also have the same relationship.

Each first anti-deflection portion 51 is in the form of a projection provided on the associated side wall 43 at a position within the deflectable range M across the imaginary line F1 in a direction along the rotational axis 23x (see FIG. 9). Further, as viewed along the rotational axis 23x as shown in FIG. 6, the first anti-deflection portion 51 of the wire passage groove 40 lies at a position to overlap the insertion axis 32x, and the first anti-deflection portion 51 of the wire passage groove 41 lies at a position to overlap the insertion axis 33x. Therefore, in either of the wires: the wire 15 that is routed in the wire passage groove 40 along the insertion axis 32x and the wire 16 that is routed in the wire passage groove 41 along the insertion axis 33x, the amount of deflection in one direction along the rotational axis 23x is limited by the associated anti-deflection portion 51. More specifically, the deflection amount is limited within a range narrower than the deflectable range M with respect to the imaginary line F1 (to a position closer to the imaginary line F2 than the imaginary line F1).

Each second anti-deflection portion 52 is in the form of a projection provided on the associated bottom wall 42 at a position within the deflectable range M across the imaginary line F2 in a direction along the rotational axis 23x (see FIG. 9). Therefore, in either of the wires: the wire 15 that is routed in the wire passage groove 40 and the wire 16 that is routed in the wire passage groove 41, the amount of deflection in another direction along the rotational axis 23x is limited by the associated anti-deflection portion 52. More specifically, the deflection amount is limited within a range narrower than the deflectable range M with respect to the imaginary line F2 (to a position closer to the imaginary line F1 than the imaginary line F2).

Limiting the deflection amount (deflection angle) of each wire 15 and 16 in the direction along the rotational axis 23x by the associated first and second anti-deflection portions 51 and 52 as described above makes it possible to achieve an improvement in durability of each wire 15 and 16. Specifically, at the insertion portion of each outer tube 21 and 22 (each drum-side end portion 21b and 22b) to the insertion hole 50 thereof, at which the deflectable range M is minimum in size, the associated wire 15 and 16 can be effectively prevented from rubbing against the edge of the insertion hole 50. This limit of deflection of each wire 15 and 16 is achieved by the associated first and second anti-deflection portions 51 and 52, which are formed on the drum housing 20, thus requiring no additional members or mechanisms and hence being achieved with a simple structure at low cost.

The first anti-deflection portion 51 and the second anti-deflection portion 52 in the wire passage groove 40 are arranged at positions closer to the drum-side end portion 21b of the outer tubes 21 than the winding drum 23 in the longitudinal direction of the wire passage groove 40 (in the extending direction of the wire 15), while the first anti-deflection portion 51 and the second anti-deflection portion 52 in the wire passage groove 41 are arranged at positions closer to the drum-side end portion 22b of the outer tubes 22 than the winding drum 23 in the longitudinal direction of the wire passage groove 41 (in the extending direction of the wire 16). This arrangement is advantageous in that it makes it possible to control the deflection width of each wire 15 and 16 at a position in the vicinity of the edge of the insertion hole 50 of the associated outer tube 21 or 22, where rubbing of the wire is easy to occur.

It is desirable that the drum housing 20, in which the housing portion opening 36 and the passage groove opening 45 are opened in the direction along the rotational axis 23x, be produced using two molds which move relative to each other in the direction along the rotational axis 23x. In this production, the first anti-deflection portion 51 and the second anti-deflection portion 52 in each wire passage groove 40 and 41 are formed at different positions in the longitudinal direction thereof. Additionally, in the bottom portion 42 of each wire passage groove 40 and 41, a through-hole 53 is formed at a position which faces the first anti-deflection portion 51 in the direction along the rotational axis 23x. According to this structure, the drum housing 20 can be formed together with the first anti-deflection portions 51 and the second anti-deflection portions 52 using the two molds that move relative to each other in the direction along the rotational axis 23x, which improves productivity of the drum housing 20.

As shown in FIG. 6, the width of the passage groove opening 45 of each wire passage groove 40 and 41 is widened at the portion where the associated first anti-deflection portion 51 is formed, and a clearance 45a (FIG. 6) is formed between the first anti-deflection portion 51 and the side wall 44 in each wire passage groove 40 and 41. Accordingly, each wire 15 and 16 can be inserted into the associated wire passage groove 40 or 41 through the associated clearance 45a, without being interfered with the associated first anti-deflection portion 51. As shown in FIGS. 4 and 5, each first anti-deflection portion 51 is provided with a tapered surface 51a which extends in an inclined direction that makes it easy to guide the associated wire 15 and 16 to the associated clearance 45a side.

Although the present invention has been described based on the above illustrated embodiment, the present invention is not limited thereto; improvements and modifications may be made without departing from the gist of the invention.

For instance, although both the first anti-deflection portion 51 and the second anti-deflection portion 52 are provided on the drum housing 20 in the above illustrated embodiment, it is also possible to provide the motor unit 26, which is mounted to the drum housing 20, with at least one anti-deflection portion. Specifically, since the cover portion 29 of the motor unit 26 has such a shape as to close the passage groove openings 45 (to constitute part of the wire passage grooves 40 and 41), a modification in which anti-deflection portions corresponding to the first anti-deflection portions 51 are provided on the cover member 29, not on the drum housing 20, is possible.

Although the first anti-deflection portion 51 is formed on the side wall 43 of each wire passage groove 40 and 41 in the illustrated embodiment, it is also possible that the first anti-deflection portion 51 be provided on the side wall 44 on the opposite side from the side wall 43.

Although the housing portion opening 36 of the drum housing portion 31 and the passage groove openings 45 of the wire passage grooves 40 and 41 are open in the same direction in the drum housing 20 of the above illustrated embodiment, the present invention is also applicable to a type of drum housing in which the housing portion opening 36 and the passage groove openings 45 are open in opposite directions along the rotational axis 23x.

The illustrated embodiment is provided with the first anti-deflection portions 51, each of which limits deflection of the associated wire 15 or 16 in a first direction (in the opening direction of the associated passage groove opening 45) in the direction along the rotational axis 23x of the winding drum 23, and the second anti-deflection portions 52, each of which limits deflection of the associated wire 15 or 16 in a second direction (in a direction toward the bottom portion 42 of the associated wire passage groove 40 or 41) opposite to the first direction. This configuration is advantageous because the wires 15 and 16 can be protected even if rotation of the winding drum 23 causes the wires 15 and 16 to deflect in either direction; however, the present invention is effective even if it is configured to limit deflection of the wires 15 and 16 only to one side in the direction along the rotational axis 23x of the winding drum 23.

Additionally, in the illustrated embodiment, the structures of the wire passage groove 40 and the wire passage groove 41 in the drum housing 20 are substantially in common with each other, and the wires 15 and 16 are under the condition that deflections of substantially equal magnitude occur in the wires 15 and 16, so that the wire passage groove 40 and the wire passage groove 41 are provided with a set of anti-deflection portions: the first anti-deflection portion 51 and the second anti-deflection portion 52 and another set of anti-deflection portions: the first anti-deflection portion 51 and the second anti-deflection portion 52, respectively, the structures of which are in common with each other; however, in the case where the wire 15 and the wire 16 are mutually different in condition such as deflection amount (e.g., the width of the deflectable range M shown in FIG. 9), the anti-deflection portions provided in the wire passage groove 40 and the anti-deflection portions provided in the wire passage groove 41 can be made mutually different in specification (shape and arrangement).

INDUSTRIAL APPLICABILITY

As described above in detail, according to the present invention, a drum housing or a drive member, which is a constituent element of a drive device for an opening/closing body for a vehicle, is provided with an anti-deflection portion which limits deflection of a wire in the rotational axis direction of a drum. The wire is wound in a spiral groove of the drum that is rotatably supported in the housing portion of the drum housing, and is inserted into an insertion hole of an outer tube an end of which is connected to an outer tube connecting portion of the drum housing. The anti-deflection portion is provided within a range surrounded by a line which connects one end of the formation range of the spiral groove and one end of the formation range of the insertion hole at the end of the outer tube and a line which connects the other end of the formation range of the spiral groove and the other end of the formation range of the insertion hole at the end of the outer tube, in the rotational axis direction of the drum, thereby preventing the wire from, e.g., rubbing against the end of the outer tube. Consequently, the durability of the wire can be improved by an inexpensive and productive configuration with a small number of components, which contributes to improvement in quality of the drive device for the opening/closing body for a vehicle.

REFERENCE SIGNS LIST

10 Window regulator
11 Guide rail
12 13 Bracket
14 Slider base
15 16 Wire
17 Guide pulley
18 Wire guide member
19 Pulley support shaft
20 Drum housing
21 22 Outer tube
21a 22a Rail-side end
21b 22b Drum-side end
23 Winding drum
23x Rotational axis
24 Shaft fitting hole
25 Spiral groove
26 Motor unit (Drive member)
27 Motor
28 Gear box
29 Cover member
30 Pulley Bracket
31 Drum housing portion (Housing portion)
32 33 Outer tube insertion portion (outer tube connecting portion)
32x 33x Insertion shaft
34 Bottom portion
35 Upright wall
36 Housing portion opening
37 Drum support seat
40 41 Wire passage groove (Wire passage portion)
42 Bottom portion
43 44 Side wall
45 Passage groove opening
45a Clearance
46 Insertion groove
47 Insertion restriction surface
50 Insertion hole
51 First anti-deflection portion (Anti-deflection portion/First anti-deflection portion)
51a Tapered surface
52 Second anti-deflection portion (Anti-deflection portion/Second anti-deflection portion)
53 Through-hole
D1 One end of the formation range of the spiral groove
D2 The other end of the formation range of the spiral groove
E1 One end of the formation range of the insertion hole of the outer tube
E2 The other end of the formation range of the insertion hole of the outer tube
F1 F2 Imaginary line which defines a deflectable range
H Formation range of the spiral groove
M Deflectable range

The invention claimed is:

1. A drive device for an opening/closing body for a vehicle, said driving device opening and closing said opening/closing body by driving a wire, wherein said driving device comprises:
   an outer tube having an insertion hole into which said wire is inserted;
   a columnar drum on a peripheral surface of which a spiral groove is formed, said wire being wound in said spiral groove;
   a drum housing including: a housing portion which rotatably supports said drum, an outer tube connecting portion into which an end of said outer tube is insertable, and a wire passage portion which allows said wire to pass through between said outer tube connecting portion and said housing portion; and
   a drive member which is installed to said drum housing and rotates said drum,
   wherein an anti-deflection portion which limits deflection of said wire in a rotational axis direction of said drum is formed on said drum housing or said drive member,
   wherein said anti-deflection portion is provided within a range surrounded by a line which connects one end of a formation range of said spiral groove and one end of a formation range of said insertion hole at said end of said outer tube that is connected to said outer tube connecting portion and a line which connects the other end of said formation range of said spiral groove and the other end of said formation range of said insertion hole at said end of said outer tube that is connected to said outer tube connecting portion, in said rotational axis direction of said drum,
   wherein said anti-deflection portion comprises: a first anti-deflection portion which limits said deflection of said wire in a first direction along said rotational axis direction of said drum; and a second anti-deflection portion which limits said deflection of said wire in a second direction opposite to said first direction,
   wherein said wire passage portion is a wire passage groove having an opening which is open in said first direction, said first anti-deflection portion being provided in said wire passage groove, and
   wherein a clearance which makes insertion and removal of said wire through said opening possible is formed between a side surface of said wire passage groove and said first anti-deflection portion.

2. The drive device for an opening/closing body for a vehicle according to claim 1, wherein said wire passage portion forms said clearance by widening a width of said opening at a portion where said first anti-deflection portion is provided.

3. A drive device for an opening/closing body for a vehicle, said driving device opening and closing said opening/closing body by driving a wire, wherein said driving device comprises:
   an outer tube having an insertion hole into which said wire is inserted;
   a columnar drum on a peripheral surface of which a spiral groove is formed, said wire being wound in said spiral groove;
   a drum housing including: a housing portion which rotatably supports said drum, an outer tube connecting portion into which an end of said outer tube is insertable, and a wire passage portion which allows said wire to pass through between said outer tube connecting portion and said housing portion; and
   a drive member which is installed to said drum housing and rotates said drum,
   wherein an anti-deflection portion which limits deflection of said wire in a rotational axis direction of said drum is formed on said drum housing or said drive member,
   wherein said anti-deflection portion is provided within a range surrounded by a line which connects one end of a formation range of said spiral groove and one end of a formation range of said insertion hole at said end of said outer tube that is connected to said outer tube connecting portion and a line which connects the other end of said formation range of said spiral groove and the other end of said formation range of said insertion hole at said end of said outer tube that is connected to said outer tube connecting portion, in said rotational axis direction of said drum,
   wherein said anti-deflection portion comprises: a first anti-deflection portion which limits said deflection of said wire in a first direction along said rotational axis direction of said drum; and a second anti-deflection portion which limits said deflection of said wire in a second direction opposite to said first direction,
   wherein said wire passage portion is a wire passage groove having an opening which is open in said first direction,
   wherein said housing portion is open in said first direction,
   wherein positions of said first anti-deflection portion and said second anti-deflection portion are mutually different in a longitudinal direction of said wire passage groove, and
   wherein said wire passage groove comprises a through-hole in a bottom portion thereof in said second direction which faces said opening at least at a position corresponding to said first anti-deflection portion.

* * * * *